United States Patent
Clark et al.

(10) Patent No.: US 7,526,106 B1
(45) Date of Patent: *Apr. 28, 2009

(54) METHOD OF TRACKING IMAGES CAPTURED WITH A DIGITAL CAMERA

(75) Inventors: Timothy P. Clark, Rochester, MN (US); Zachary A. Garbow, Rochester, MN (US); Richard Theis, Sauk Rapids, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/113,309

(22) Filed: May 1, 2008

Related U.S. Application Data

(63) Continuation of application No. 11/971,376, filed on Jan. 9, 2008, now Pat. No. 7,391,886.

(51) Int. Cl.
*G06K 9/00* (2006.01)

(52) U.S. Cl. ........................ 382/116; 382/103; 382/118; 348/169

(58) Field of Classification Search .................. 382/103, 382/118, 115, 162, 128, 167, 263, 100, 275; 396/57, 298, 299, 300, 303; 358/1.9, 488, 358/518, 504, 3.26, 497; 348/169, E9.037, 348/E9.052, E9.054, 333.02; 378/38
See application file for complete search history.

(56) References Cited

U.S. PATENT DOCUMENTS

| | | | |
|---|---|---|---|
| 5,771,307 A | 6/1998 | Lu et al. | |
| 6,142,876 A | 11/2000 | Cumbers | |
| 6,359,647 B1 * | 3/2002 | Sengupta et al. | 348/154 |
| 6,396,963 B2 | 5/2002 | Shaffer et al. | |
| 6,522,772 B1 | 2/2003 | Morrison et al. | |
| 6,526,158 B1 | 2/2003 | Goldberg | |
| 6,611,206 B2 * | 8/2003 | Eshelman et al. | 340/573.1 |
| 6,690,374 B2 * | 2/2004 | Park et al. | 345/427 |
| 6,911,907 B2 * | 6/2005 | Kelliher et al. | 340/522 |
| 7,035,440 B2 * | 4/2006 | Kaku | 382/115 |
| 7,106,885 B2 | 9/2006 | Osterweil et al. | |
| 7,130,466 B2 * | 10/2006 | Seeber | 382/218 |
| 7,272,242 B2 * | 9/2007 | Nevis et al. | 382/103 |
| 7,391,886 B1 * | 6/2008 | Clark et al. | 382/116 |
| 2006/0250666 A1 * | 11/2006 | Wexler et al. | 358/487 |
| 2008/0046930 A1 * | 2/2008 | Smith et al. | 725/46 |

* cited by examiner

*Primary Examiner*—Sheela C Chawan
(74) *Attorney, Agent, or Firm*—Cantor Colburn LLP

(57) ABSTRACT

A method of tracking images captured by a digital camera includes inputting a profile marker to a profile information database in the digital camera, establishing a profile ratio for captured images. The profile ratio sets a number of captured images required to contain the profile marker. The method further requires scanning with a tracking system captured images stored a memory for the profile marker, and providing one of a visual alarm and an audible alarm indicating that the number of captured images containing the profile marker is less than the profile ratio.

4 Claims, 2 Drawing Sheets

METHOD OF TRACKING IMAGES CAPTURED WITH A DIGITAL CAMERA

CROSS REFERENCE TO RELATED APPLICATIONS

This application is a continuation application of U.S. Ser. No. 11/971,376, filed on Jan. 9, 2008, the disclosure of which is incorporated by reference herein in its entirety.

BACKGROUND OF THE INVENTION

1. Field of the Invention

This invention relates to the art of digital cameras and, more particularly, to a method of tracking images captured with a digital camera.

2. Description of Background

Photography is an art that typically requires years of practice to master. In addition, professional level cameras include numerous functions that require time and effort to understand. While many people prefer to devote the time and effort to master the art of photography and the intricacies of professional cameras, others prefer a more simple point and shoot approach to photography. With the advent of digital cameras, novice photographers can obtain professional quality photographs without requiring years of practice. That is, digital cameras include various systems that enable a novice photographer to enhance, modify, or otherwise change captured images to create a professional quality photograph.

Unfortunately, intelligent focusing, shutter speed enhancements, exposure, ISO systems, and/or color balance systems cannot overcome all photography problems. Often times a photographer will come to realize too late that a certain person(s) is in all captured images while another person(s) is not in any photographs. In other instances, the photographer, upon reviewing the captured images discovers that all the photographs include scenery, e.g., mountains, monuments, landscapes etc. and no images of people. Failing to capture images of certain subject matter can lead to a certain amount of frustration.

SUMMARY OF THE INVENTION

The shortcomings of the prior art are overcome and additional advantages are provided through the provision of a method of tracking images captured by a digital camera. The method includes inputting a profile marker to a profile information database in the digital camera, establishing a profile ratio for captured images. The profile ratio sets a number of captured images required to contain the profile marker. The method further requires scanning with a tracking system captured images stored a memory for the profile marker, and providing one of a visual alarm and an audible alarm indicating that the number of captured images containing the profile marker is less than the profile ratio.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
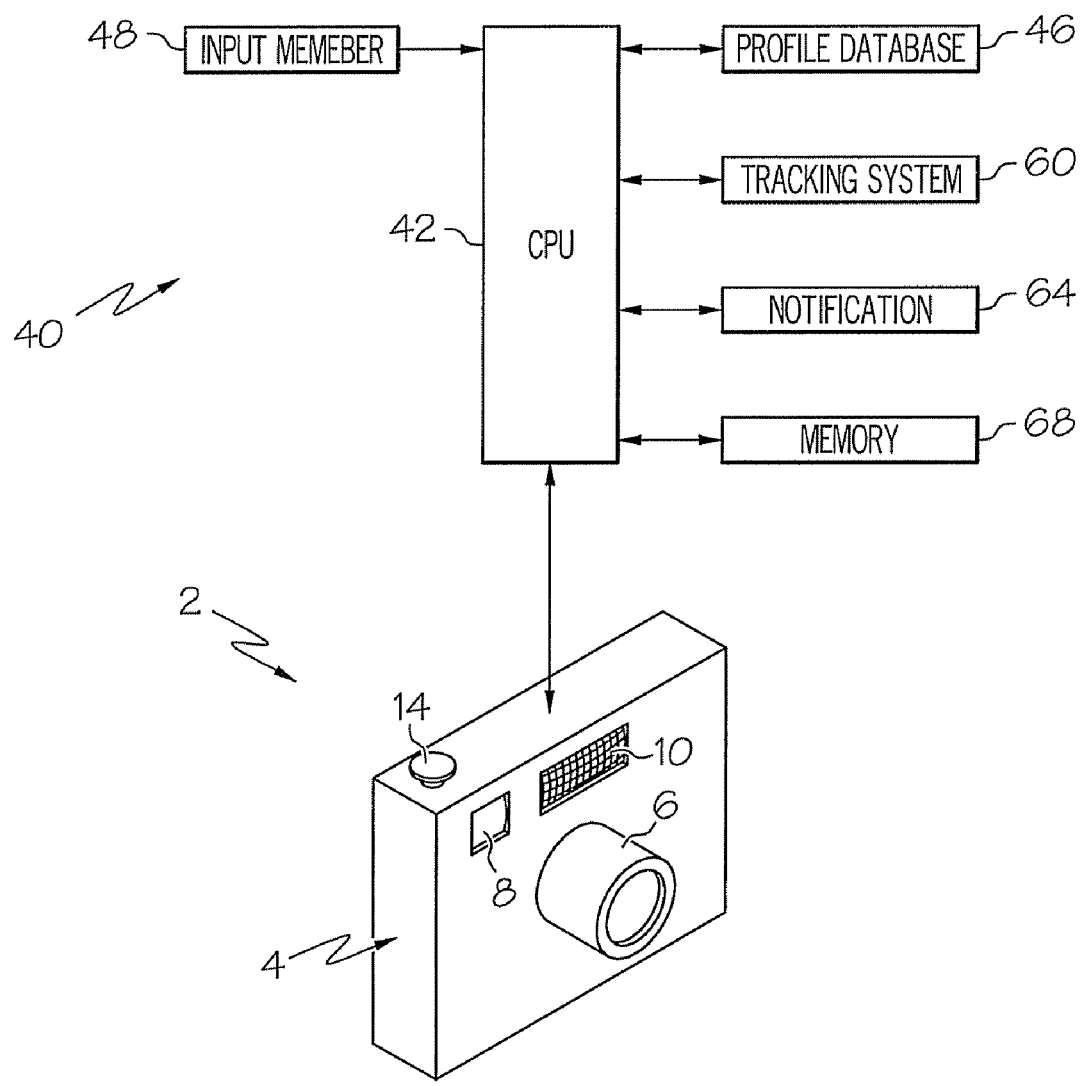
FIG. 1 is a perspective view of a digital camera system including an image tracking system in accordance with an exemplary embodiment of the invention.

With initial reference to FIG. 1 a camera system constructed in accordance with an exemplary embodiment of the present invention is generally indicated at 2. Camera system 2 includes a camera body 4 having a lens 6 and a viewing element 8. Camera body 4 is also shown to include a flash 10 as well as activation member 14 that is selectively employed to capture digital images. Although not shown, it should be understood that camera body 4 also includes a display mounted on a rear surface of camera body 4 as well as an auto focus system that selectively focuses lens 6 to capture digital images.

In accordance with the exemplary embodiment shown, camera system 2 includes an image tracking system 40 that aids a user in capturing digital images of a selected individual(s) or group(s) during the course of a predetermined time period as will be described more fully below. Image tracking system 40 includes a central processing unit 42 operatively connected to a profile database 46. Profile database 46 includes individual and/or group profiles of a particular individual(s) and/or groups. More specifically, an individual profile includes an individual profile marker such as, for example, a facial image of an individual. Group profiles include a plurality of individual profile markers. Group profiles can include, for example, facial images of family or individuals and the like. With this configuration, a user creates profiles that are input into profile database 46 via an input member 48. Profiles are either directly input into camera system 2 or via the Internet thereby allowing remote users to request photographs of particular individuals. Camera system 2 further includes a tracking system 60 that scans captured images for individual profile markers, and a notification system 64 that notifies a user that less than a selected number of individual profile markers are currently present in the captured images stored in a memory unit 68.

Figure 2:
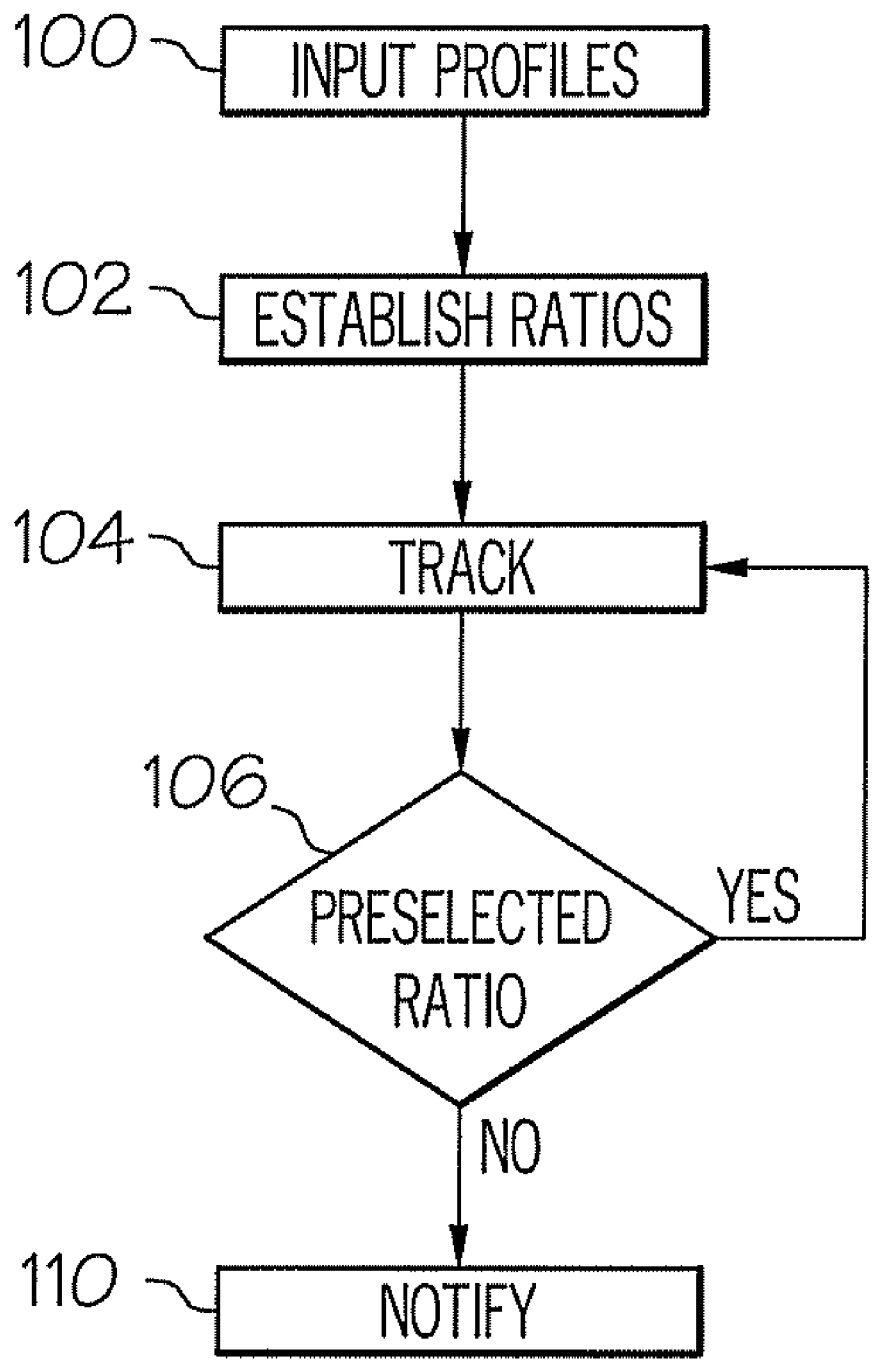
FIG. 2 is a flow diagram illustrating a method of tracking images with the image tracking system of FIG. 1 in accordance with an exemplary embodiment of the present invention.

Reference will now be made to FIG. 2 in describing an exemplary method of tracking individual profile markers employed by image tracking system 40. In accordance with the embodiment shown, individual profiles are loaded or input into profile information database 46, as indicated in block 100. As discussed above, profiles are categorized as separate individual profiles each of which includes an individual profile marker or a group that includes a plurality of individual profile markers. Once the individual profile markers are input into profile information database 46, the user establishes a preferred ratio of profile marker(s) present in captured images for a predetermined time period, as indicated in block 102. More specifically, the user will establish a ratio(s) such as, for example, individuals A and B must appear in a minimum of 10 pictures. Alternatively, the ratio can require that users A and B be present in at least 25% of photos captured during the predetermined time period. As yet another alternative, the user can require that at least 50% of the pictures include family members or groups of certain individuals.

In addition to directly inputting the ratio(s) into camera 2, requests can also be submitted by users over the Internet or, via a wireless connection to camera system 2. For example, in a group setting one particular person is designated as a photographer responsible for capturing pictures, each member of the group can submit a request for how many photos they wish to appear in. The requests are aggregated into a single ratio in block 102 and tracked by a tracking system 60. In accordance with another aspect of the invention, multiple camera systems 2 are linked through a wireless protocol. In this configuration, each camera system 2 communicates one with the other to ensure that the ratio(s) set in block 102 are met. That is, images captured in each of a plurality of digital camera systems are scanned for individual profile markers to ensure that the ratio(s) established in block 102 while perhaps not met in one camera, may be met when considering all captured images taken by the plurality of camera systems.

In any event, once the ratio(s) for the particular time period is established in block 102, tracking system 60 analyzes each captured image to determine whether the subject matter contains one or more individual markers. Tracking system 60 maintains a tally or aggregate of the number of pictures captured and the number of images containing individual profile markers. The tally is compared to the total number of captured images and the ratio established in block 102, in block 106. If tracking system 60 determines that the captured images contain a sufficient number of individual profile markers to meet the ratio(s) established in block 102, tracking continues. If tracking system 60 determines that the number of captured images currently within memory 68 do not contain a sufficient number of individual profile markers to meet the ratio(s) established in block 102, the user is provided with a notification in block 110 indicating that additional photographs must be taken of certain individual(s) or group(s) in order to meet the ratio(s). The notification is an audible alarm, or alternatively a text message presented on the image display (not shown).

In accordance with another aspect of invention, the analysis of the captured images takes place on demand such as upon the user selecting a track images function. Alternatively, tracking can occur automatically when camera system 2 is plugged into a charger. By performing tracking on demand, or when charging, battery life is preserved. That is, in order to reduce camera processing time, a user can selectively request that the captured images stored in memory 68 be analyzed for individual profile markers to ascertain whether the established ratio(s) is met or whether additional photographs of certain individuals are required. Power can also be conserved by tracking profile marker only when camera system 2 is directly connected to a power source. In any event, at this point, it should be appreciated that the present invention provides a user with a system that ensures that images captured during a pre-selected time period contain images of particular individuals and/or groups. In addition to tracking individuals and groups, the present invention can track other profiles input to profile database 46, such as, for example, attractions and the like. In any case, the present invention provides a photographer with an additional confidence that during vacations and/or special events people are getting sufficient camera time in the photos. The present invention can prevent situations in which, after an event or vacation, a user determines that a particular person was left out the many or all photos.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of tracking images captured by a digital camera, the method comprising:
   inputting a profile marker to a profile information database in the digital camera;
   establishing a profile ratio for captured images, the profile ratio setting a number of captured images required to contain the profile marker;
   scanning with a tracking system captured images stored a memory for the profile marker; and
   providing one of a visual alarm and an audible alarm indicating that the number of captured images containing the profile marker is less than the profile ratio.

2. The method of claim 1, further comprising: detecting the profile marker in the captured images with a facial recognition algorithm.

3. The method of claim 1, wherein the one of the visual and audible alarm is provided prior to capturing an image.

4. The method of claim 1, further comprising: activating the tracking system only upon sensing a power input to the camera body to save energy.

* * * * *